United States Patent
Kirchner et al.

(10) Patent No.: US 9,011,686 B2
(45) Date of Patent: Apr. 21, 2015

(54) FILTER CARTRIDGE WITH ANTI-DRIP FEATURE

(75) Inventors: Richard A. Kirchner, Apple Valley, MN (US); Nathan E. Marks, Rosemount, MN (US); Jeremy A. Schmoll, Pine Island, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 260 days.

(21) Appl. No.: 13/510,170

(22) PCT Filed: Nov. 18, 2010

(86) PCT No.: PCT/US2010/057197
§ 371 (c)(1),
(2), (4) Date: May 16, 2012

(87) PCT Pub. No.: WO2011/063100
PCT Pub. Date: May 26, 2011

(65) Prior Publication Data
US 2012/0279916 A1    Nov. 8, 2012

Related U.S. Application Data (60) Provisional application No. 61/263,182, filed on Nov. 20, 2009.

(51) Int. Cl.
*B01D 35/30* (2006.01)
*B01D 35/153* (2006.01)

(52) U.S. Cl.
CPC .............. *B01D 35/153* (2013.01); *B01D 35/30* (2013.01); *B01D 2201/302* (2013.01)

(58) Field of Classification Search
CPC . B01D 35/153; B01D 35/20; B01D 2201/302
USPC .......................... 210/248, 440, 443, 444, 498
See application file for complete search history.

(56) References Cited

U.S. PATENT DOCUMENTS

| 5,681,461 A | 10/1997 | Gullett |
| 5,753,117 A | 5/1998 | Jiang |
| 6,632,355 B2 | 10/2003 | Fritze |

(Continued)

FOREIGN PATENT DOCUMENTS

| CN | 1835788 | 9/2006 |
| JP | 2008-542001 | 11/2008 |

(Continued)

OTHER PUBLICATIONS

PCT International Search Report for PCT/US2010/057197, mailed Sep. 2, 2011.

*Primary Examiner* — Matthew O Savage
(74) *Attorney, Agent, or Firm* — Aleksander Medved; Scott A. Baum (57) ABSTRACT

A filter cartridge is disclosed comprising a housing comprising a terminal end, a connective end, and a longitudinal axis, the connective end comprising a fluid inlet and a fluid outlet. The filter cartridge further comprises a filtration media disposed within the housing between the terminal end and the connective end and fluidly connecting the fluid inlet to the fluid outlet. One of the fluid inlet or the fluid outlet comprises one or more anti-drip capillary channels, the transverse cross-section of the anti-drip capillary channels being elongate in at least one direction.

22 Claims, 7 Drawing Sheets

(56) References Cited

U.S. PATENT DOCUMENTS

| | | |
|---|---|---|
| 6,949,189 B2 | 9/2005 | Bassett |
| 7,135,113 B2 | 11/2006 | Bassett |
| 7,481,928 B2 | 1/2009 | Fritze |
| 2006/0113235 A1 | 6/2006 | Strohm et al. |
| 2006/0243652 A1* | 11/2006 | Tubby et al. ............... 210/248 |
| 2009/0242470 A1 | 10/2009 | Muenkel |

FOREIGN PATENT DOCUMENTS

| | | |
|---|---|---|
| WO | WO 2005/099862 | 10/2005 |
| WO | WO-2006/121932 | 11/2006 |

* cited by examiner

FILTER CARTRIDGE WITH ANTI-DRIP FEATURE

Cross Reference to Related Applications

This application is a national stage filing under 35 U.S.C. 371 of PCT/US2010/057197filed Nov. 18, 2010, which claims priority to United States Provisional Application No. 61/263,182, filed Nov. 20, 2009, the disclosures of which are incorporated by reference in their entireties herein.

BACKGROUND

Appliances such as refrigerators often include means for delivering ice and chilled water to a consumer. The delivered water, as well as the water used to make the ice, is preferably filtered to remove impurities and improve taste. Thus, many refrigerators include disposable water filter cartridges on board to filter residential tap water before delivery to the consumer.

Because space is at a premium in most residences, it is often desirable to design such refrigerators such that the overall space consumed by the water filtration system is minimized and the filter cartridge is easily accessible by the consumer for convenient removal and replacement. A design utilizing these criteria may result in the filter cartridge being optimally positioned in different orientations. For example, the filter cartridge may be installed and removed in a horizontal orientation—i.e., tipped on its side.

When a used filter cartridge is removed from a refrigerator, the cartridge typically contains residual water that can undesirably drip or spill from the cartridge. This is particularly likely where the filter cartridge is oriented horizontally, where the residual water tends to run from the inlet or outlet ports on the cartridge. Even in refrigerators where filter cartridges are not installed and removed horizontally, the consumer may spill residual water if the filter cartridge is accidentally tipped horizontally or held upside down.

There is a continuing need for filter cartridges that can reduce or prevent dripping or spilling when removed from an appliance. There is also a need for filter cartridges that can reduce or prevent dripping or spilling when removed from an appliance while not increasing the pressure drop across the filter cartridge. There is also a need for filter cartridges that can reduce or prevent dripping or spilling when removed from an appliance without the use of valves or other moving parts. There is also a need for filter cartridges that can reduce or prevent dripping or spilling when removed from an appliance while being relatively easy to manufacture.

SUMMARY OF THE INVENTION

The present disclosure relates generally to water filtration systems comprising disposable filter cartridges. The present disclosure further relates to filter cartridges comprising an anti-drip feature. Such systems can prevent dripping while providing a relatively larger proportion of open area for water to flow through as compared with known filter cartridges. Because of the relatively larger open area for water flow, filter cartridges according to the present disclosure can be manufactured to have reduced flow resistance as compared with known filters. Anti-drip features according to the present disclosure can be more easily manufactured than known anti-drip features.

In one embodiment, the present disclosure provides a filter cartridge comprising a housing comprising a terminal end, a connective end, and a longitudinal axis. Typically, the connective end comprises a fluid inlet and a fluid outlet. A filtration media is disposed within the housing between the terminal end and the connective end. The filtration media fluidly connects the fluid inlet to the fluid outlet, and one of the fluid inlet or the fluid outlet comprises one or more anti-drip capillary channels, the transverse cross-section of the anti-drip capillary channels being elongate in at least one direction.

In some embodiments, the transverse cross-section of the anti-drip capillary channel comprises an elongate dimension and a minor dimension, wherein the minor dimension is in a range from about 0.020 inches (about 0.0508 centimeter) to about 0.060 inches (about 0.1524 centimeter) and the elongate dimension is greater than about 0.080 inches (about 0.2032 centimeter). In one embodiment, the minor dimension is in a range from about 0.025 inches (about 0.0635 centimeter) to about 0.040 inches (about 0.1016 centimeter). In one embodiment, the minor dimension is about 0.030 inches (about 0.0762 centimeter).

In some embodiments, the elongate dimension of one or more of the anti-drip capillary channels comprises a curved portion. In some embodiments, the elongate dimension of one or more of the anti-drip capillary channels comprises a substantially straight line. In some embodiments, the elongate dimension of one or more of the anti-drip capillary channels comprises a vertex. In one embodiment, the minor dimension of one or more of the anti-drip capillary channels is substantially constant along the elongate dimension.

In some embodiments, the anti-drip capillary channels radiate outwardly from the longitudinal axis. In some embodiments, the anti-drip capillary channels are oriented parallel to one another. In some embodiments, the anti-drip capillary channels are oriented circumferentially about the longitudinal axis.

In one embodiment, the connective end comprises an inner post sealed to the filtration media and a central conduit in fluid communication with an open inner core of the filtration media. In some such embodiments, a sleeve is formed in the connective end of the housing and radially surrounds the inner post. In some embodiments, the one or more anti-drip capillary channels are disposed on a flange spanning an annular region between the inner post and the sleeve, the anti-drip capillary channels being in fluid communication with an outer surface of the filtration media.

In one embodiment, the inner post comprises the flange. In some such embodiments, the flange is not affixed to the sleeve. In some embodiments, one or more of the anti-drip capillary channels interrupts a radial outer edge of the flange.

In another embodiment, the sleeve comprises the flange. In some such embodiments, the flange is not affixed to the inner post. In some embodiments, one or more of the anti-drip capillary channels interrupts a radial inner edge of the flange.

In some embodiments, the central conduit forms the fluid outlet and the one or more anti-drip capillary channels form the fluid inlet.

In one embodiment, each anti-drip capillary channel comprises at least one channel sidewall, wherein the Ra surface roughness height of the at least one channel sidewall is greater than about 64 microinches (about 1.626 micrometers).

In some embodiments, each anti-drip capillary channel further comprises a depth dimension measured along the longitudinal axis, wherein the depth dimension is in a range from about 0.30 inches (about 0.762 centimeter) to about 1.0 inches (about 2.54 centimeters). In one embodiment, the depth dimension is in a range from about 0.40 inches (about 1.016 centimeters) to about 0.70 inches (about 1.778 centimeters).

The present disclosure also provides a method of forming an anti-drip capillary channel comprising designing a mold to form an anti-drip capillary channel having a channel sidewall, specifying a texturization of the mold to impart an Ra surface roughness height of at least 64 microinches (1.626 micrometers) to the channel sidewall, and injecting a molten plastic into the texturized mold to form an anti-drip capillary channel having a channel sidewall with an Ra surface roughness height of at least 64 microinches (1.626 micrometers).

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION OF THE DRAWINGS

Figure 1:
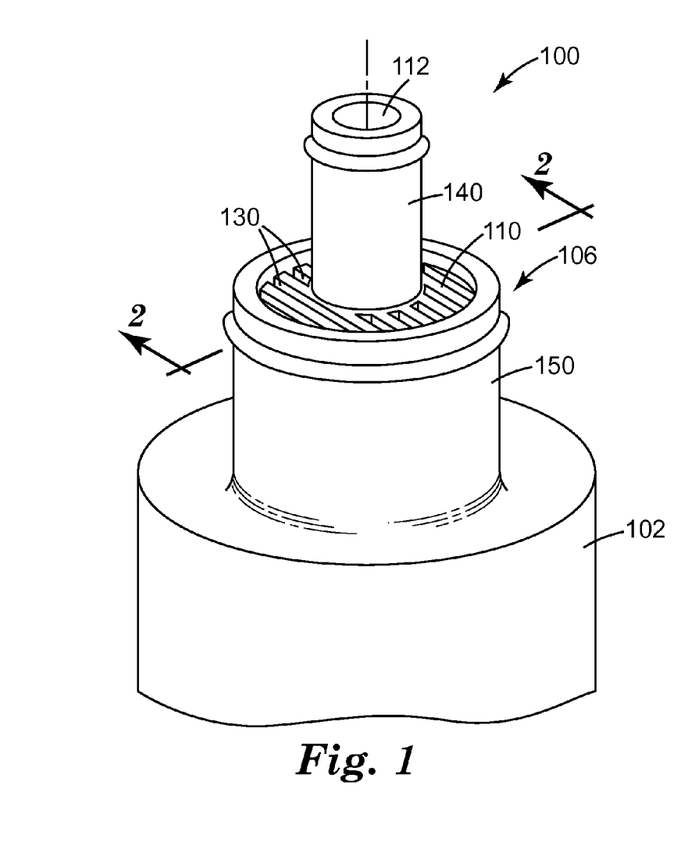
FIG. 1 is a perspective view of a filter cartridge according to the present disclosure.
Figure 2:
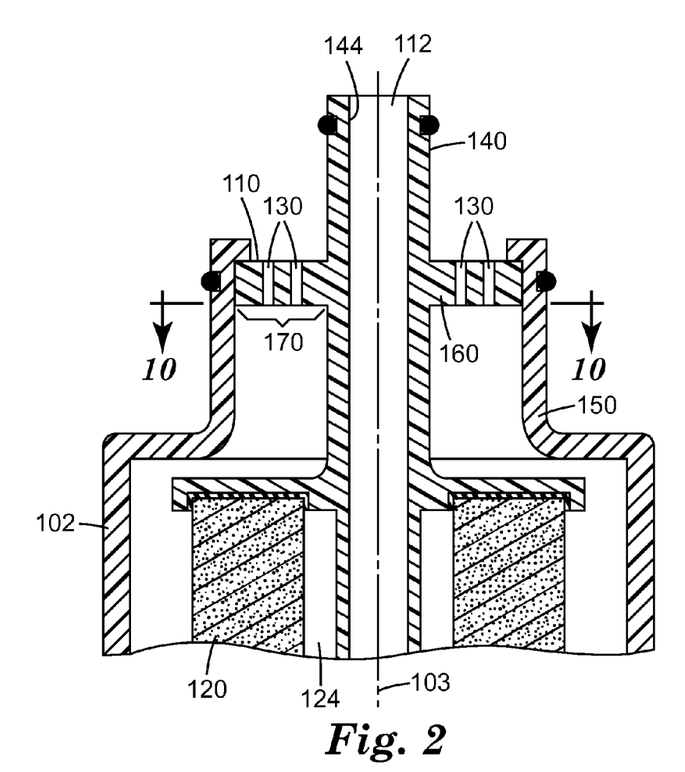
FIG. 2 is a cross-section view taken at 2-2 of FIG. 1 of a filter cartridge according to the present disclosure.
Figure 17:
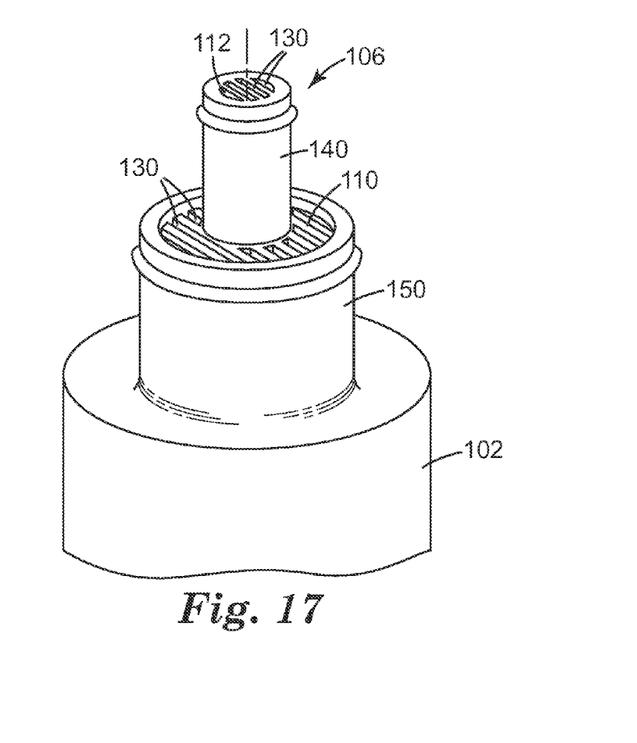
FIG. 17 is a perspective view of an exemplary connective end according to an embodiment of the present disclosure.

FIGS. 1 and 2 depict an exemplary filter cartridge 100 according to the present disclosure. As shown, filter cartridge 100 comprises a housing 102 comprising a terminal end 104 (FIG. 11 or 12), a connective end 106, and a longitudinal axis 103. Typically, the connective end 106 comprises a fluid inlet 110 and a fluid outlet 112. A filtration media 120 is disposed within the housing 102 between the terminal end 104 and the connective end 106. The filtration media 120 fluidly connects the fluid inlet 110 to the fluid outlet 112, and one of the fluid inlet 110 or the fluid outlet 112 comprises one or more anti-drip capillary channels 130, the transverse cross-section of the anti-drip capillary channels 130 being elongate in at least one direction. FIGS. 1 and 2 depict the fluid inlet 110 as comprising one or more anti-drip capillary channels 130. It is envisioned that the anti-drip capillary channels 130 could also form the fluid outlet 112 as shown in FIG. 17, where connective end 106 comprises an inner post 140. It is also envisioned that both fluid inlet 110 and fluid outlet 112 could comprise one or more anti-drip capillary channels 130.

The anti-drip capillary channels 130 can reduce or prevent dripping of residual fluid entrained within a filter cartridge 100 in at least two ways.

Figure 11:
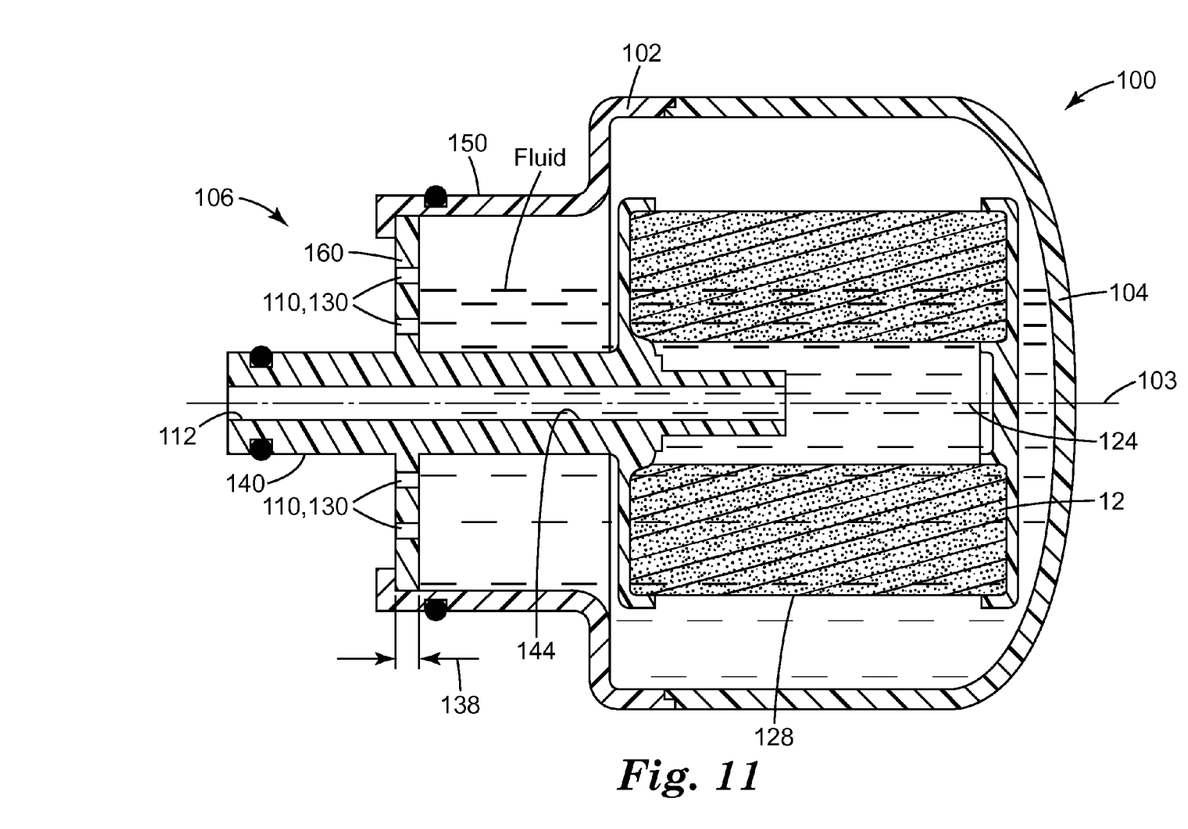
FIG. 11 is a cross-section view taken at 2-2 of FIG. 1 a filter cartridge according to the present disclosure in a tipped orientation with residual fluid inside.
Figure 13:
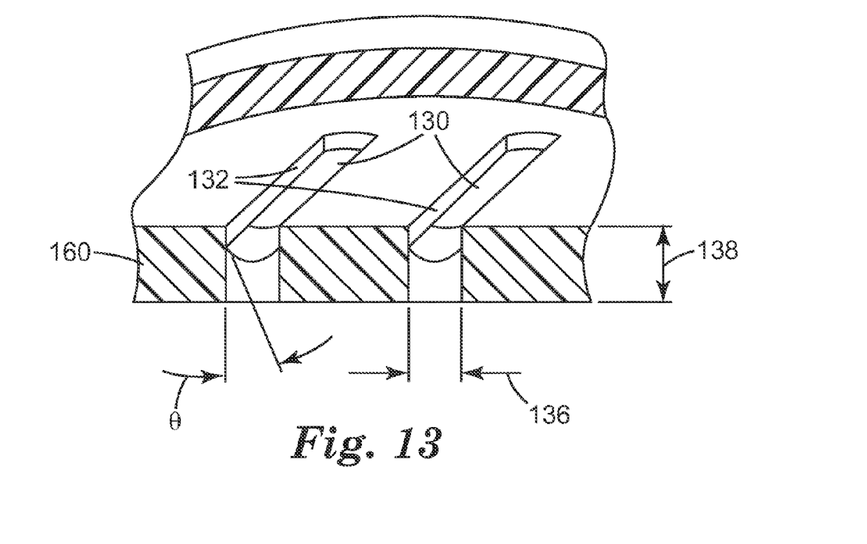
FIG. 13 is a perspective cross-section view taken at 13-13 of FIG. 5 of exemplary anti-drip capillary channels according to the present disclosure.

First, as depicted in FIGS. 11 and 13, residual water is pulled by capillary action into the anti-drip capillary channels 130. Once residual water is pulled into the anti-drip capillary channels 130, it is retained by force interaction between the water and the channel sidewall 132. The attractive forces resulting from this capillary action strong enough that, even when the filter cartridge 100 is tipped on its side, gravitational force alone will typically be insufficient to cause the residual water to flow completely through the anti-drip capillary channels 130 and cause a drip or spill.

Next, fluid is retained in the other fluid port (typically, though not always, the fluid outlet 112, through central conduit 144) by virtue of a vacuum created by the residual water being retained in the anti-drip capillary channels 130. This situation is analogous to a thumb plugging one end of a fluid-filled drinking straw, wherein the fluid will not flow out of the free end of the straw because the vacuum seal created by the thumb over the opposite end prevents air infiltration. Here, the residual water retained in the anti-drip capillary channels 130 plays a role akin to the thumb on the straw, preventing air infiltration that would break the vacuum and release fluid from the other fluid port.

A similar anti-dripping phenomenon was previously described in commonly-owned U.S. Pat. No. 6,632,355 to Fritze ("Fritze '355"), the disclosure of which is hereby incorporated by reference in its entirety. Fritze '355, however, does not disclose the use of anti-drip capillary channels, but rather reports the use of small diameter bores (i.e., bores having a circular transverse cross-section). According to Fritze '355,

[T]he small diameter bores on the filter end cap are sized so that the surface tension of the water prevents spillage out of the small diameter bores when the water filter assembly is removed. This in turn creates a vacuum which prevents water from spilling out of the through bore on the filter end cap as well.

Fritze '355, col. 8, lines 44-49 (reference numbers omitted).

However, the small diameter bores of Fritze '355 may have certain drawbacks in use. For example, the small diameter bores, typically about 0.050" in diameter, must generally either be machined (i.e., drilled) or molded using tiny pins. Machining is typically more expensive and time consuming than a molding operation, and the tiny pins used to mold the small diameter bores are quite fragile and prone to damage. Thus, both manufacturing methods may be disadvantageous.

Moreover, even if a plurality of Fritze '355-type bores are formed into a single part, the relative amount of open area created for fluid flow (open area in the transverse cross section) is significantly smaller than can be created when one or more anti-drip capillary channels 130 are employed.

For example, assuming small diameter bores according to Fritze '355 having a diameter D are arranged along a path of length L with centers spaced apart a distance of x, the total open area for water flow $A_{bores}$ may be calculated as:

$$A_{bores} = \frac{\pi \cdot L \cdot D^2}{4 \cdot x} \qquad \text{Eq. 1}$$

Conversely, for an anti-drip capillary channel 130 having a width W (i.e., a minor dimension 136) and a path length L (i.e., an elongate dimension 134), the total open area for water flow $A_{channel}$ may be calculated as:

$$A_{channel} = L \cdot W \quad \text{Eq. 2}$$

The ratio of $A_{channel}$ to $A_{bores}$ is then calculated as:

$$\frac{A_{channel}}{A_{bores}} = \frac{4 \cdot x \cdot L \cdot W}{\pi \cdot L \cdot D^2},$$

which simplifies to:

$$\frac{A_{channel}}{A_{bores}} = \frac{4 \cdot x \cdot W}{\pi \cdot D^2} \quad \text{Eq. 3}$$

It should be understood that, in practice, the distance, x, between centers of the small diameter bores must be larger than D, since any smaller value of x would result in adjacent bores interfering with one another. Thus, although not practical in reality, the number of small diameter bores in a given path length L is theoretically maximized when x=D. Thus, the ratio of $A_{channel}$ to $A_{bores}$ when $A_{bores}$ is theoretically maximized may be calculated by substituting D for x in Eq. 3, giving:

$$\frac{A_{channel}}{A_{bores}} = \frac{4 \cdot W}{\pi \cdot D} \quad \text{Eq. 4}$$

Thus, if the width W of the anti-drip capillary channel 130 is selected to be equal to the diameter D of each bore, the ratio of $A_{channel}$ to $A_{bores}$ should always be larger than:

$$\frac{A_{channel}}{A_{bores}} = \frac{4}{\pi} = 1.27 \quad \text{Eq. 5}$$

Accordingly, when arranged as described above, an anti-drip capillary channel 130 should always be capable of creating at least 27% more open area for water flow than a row of small diameter bores whose diameter is the same as the width of the anti-drip capillary channel 130. Of course, in practical application, this ratio will typically be much larger since small diameter bores will need to be spaced at much larger intervals, resulting in fewer small diameter bores per unit length. One practical comparison is illustrated below.

Assuming small diameter bores as taught by Fritze '355 having a diameter of 0.050" whose centers are spaced apart a distance of two diameters (0.100") over a path length of 2", the total open area for water flow $A_{bores}$ is calculated as:

$$A_{bores} = \frac{\pi \cdot (2 \cdot \text{in}) \cdot (0.050 \cdot \text{in})}{8} = 0.0393 \cdot \text{in}^2 \quad \text{Eq. 6}$$

Then, assuming an anti-drip capillary channel 130 having a width of 0.030" and a path length of 2", the total open area for water flow $A_{channel}$ may be calculated as:

$$A_{channel} = (2 \cdot \text{in}) \cdot (0.030 \cdot \text{in}) = 0.060 \cdot \text{in}^2 \quad \text{Eq. 7}$$

Thus, for the above-noted examples, the ratio of $A_{channel}$ to $A_{bores}$ is:

$$\frac{A_{channel}}{A_{bores}} = \frac{0.060 \cdot \text{in}^2}{0.0393 \cdot \text{in}^2} = 1.53 \quad \text{Eq. 8}$$

Accordingly, in the above typical practical application, a single anti-drip capillary channel 130 can create about 53% more open area for water flow than a typical row of small diameter bores placed along the same length, while still providing an anti-drip function to a filter cartridge 100. Thus, because anti-drip capillary channels 130 can provide a relatively greater open area for water flow than a typical row of small diameter bores, and because the anti-drip capillary channels 130 provide the fluid inlet 110 or fluid outlet 112 of a filter cartridge 100, filter cartridges 100 according to the present disclosure may be designed to have a relatively lower overall pressure drop.

As discussed in the examples above, the width W may be equated to the minor dimension 136 of the one or more anti-drip capillary channels 130, while the path length L may be equated to the elongate dimension 134.

Figure 3:
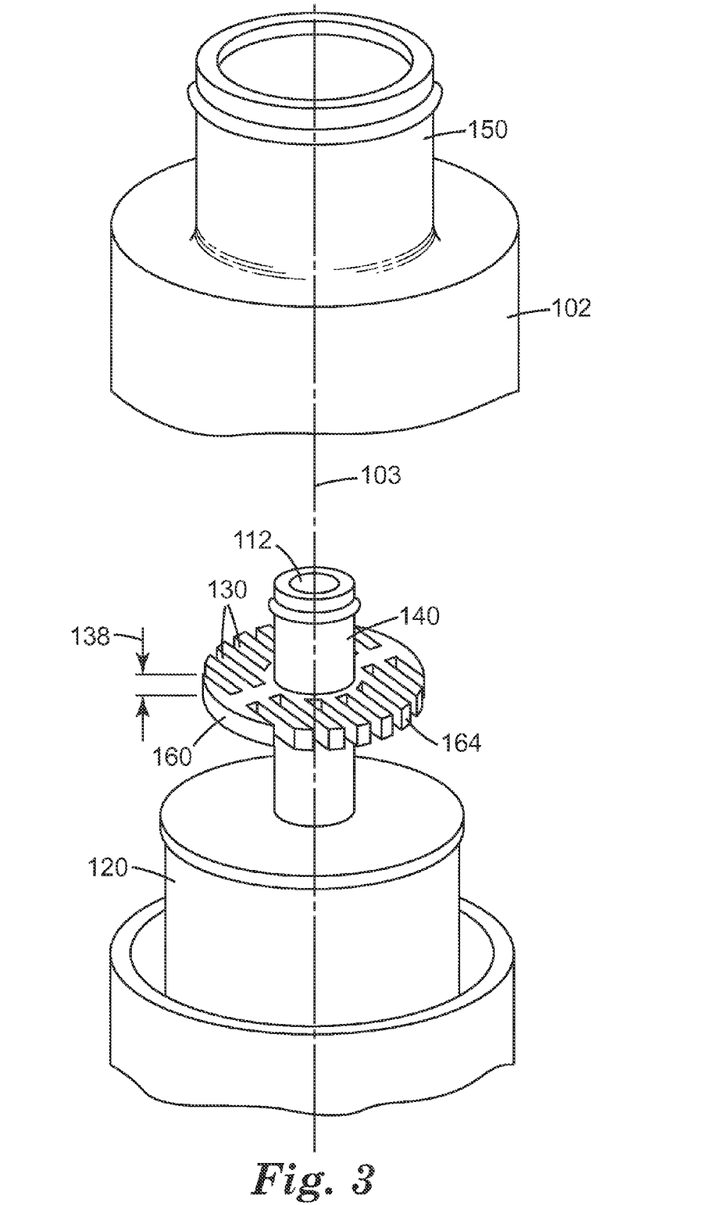
FIG. 3 is an exploded perspective view of a filter cartridge according to the present disclosure.

As shown in FIGS. 2 and 3, the connective end 106 may be constructed from multiple parts. As depicted, the connective end 106 comprises an inner post 140 placed along the longitudinal axis 103 within a sleeve 150. Typically, though not necessarily, the sleeve 150 is integrally formed on the housing 102. In some embodiments, the inner post 140 comprises a central conduit 144 in fluid communication with an open inner core 124 of the filtration media 120. As shown, the central conduit 144 terminates in the fluid outlet 112. The sleeve 150 may comprise a cylindrical protrusion from the housing 102. In some embodiments, an annular region 170 spans the space between the inner post 140 and the sleeve 150. In some embodiments, one or more anti-drip capillary channels 130 are disposed on a flange 160 that spans the annular region 170.

Figure 4:
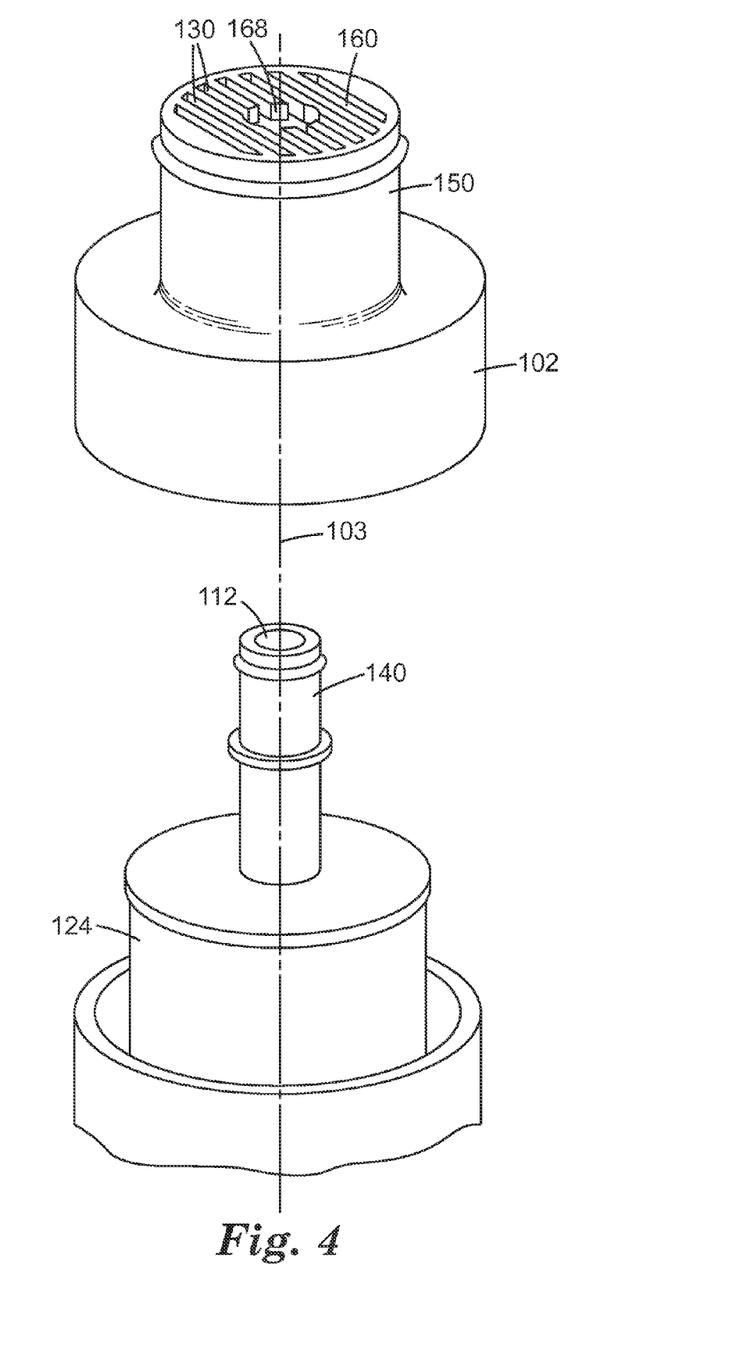
FIG. 4 is an exploded perspective view of a filter cartridge according to the present disclosure.

The flange 160 may radiate inwardly from the sleeve 150, as shown in FIG. 4, or may radiate outwardly from the inner post 140, as shown in FIG. 3.

The transverse cross-section of an anti-drip capillary channel 130 may be closed, as shown in FIGS. 5-10, or one or more anti-drip capillary channels 130 may interrupt a radially outer edge 164 or radially inner edge 168 of the flange 160, as shown in FIGS. 3 and 4, respectively. When one or more anti-drip capillary channels 130 interrupts a radially outer or inner edge 164 or 168, the interrupted radial edge may or may not be affixed to an adjacent surface. As shown in FIG. 2, a flange 160 radiates outwardly from inner post 140 and fits closely against, but is not affixed to, sleeve 150. In such embodiments, there may be a small gap between the flange 160 and the sleeve 150. This small gap can create a fluid bypass, but is tolerable so long as the gap is more restrictive of fluid than the one or more anti-drip capillary channels 130. Such a construction can preserve the anti-drip functionality of the filter cartridge 100 while making assembly of the inner post 140 into the sleeve 150 faster and easier.

In embodiments where the flange 160 radiates outwardly from the inner post 140, it may be advantageous to construct the anti-drip capillary channels 130 such that they interrupt the radial outer edge 164 of the flange 160. For example, when the inner post 140 is injection molded, a mold that parts parallel to the longitudinal axis 103 of the filter cartridge 100 may be easier and less expensive to design and build than a mold that parts orthogonal to the longitudinal axis 103. When the mold parts parallel to the longitudinal axis 103, "fingers" or "fins" projecting from each half of the mold may form the one or more anti-drip capillary channels 130 in the molten plastic, while leaving the flange 160 with an interrupted radial outer edge 164 when the mold halves pull away.

In some embodiments, the filtration media 120 is affixed to the inner post 140. In some such embodiments, the central conduit 144 protrudes into the open inner core 124 of the filtration media 120. The filtration media 120 may comprise, for example, a carbon block, a pleated composite, a hollow-fiber bundle, a reverse osmosis membrane, or combinations thereof. Typically, the inner post 140 is affixed to the filtration media 120 in such a way as to prevent fluid bypass between the inner post 140 and the filtration media 120. In such embodiments, a fluid to be filtered must flow into the fluid inlet 110, penetrate the outer surface 128 of the filtration media 120, flow through the filtration media 120 into the open inner core 124, then through the central conduit 144 of the inner post 140, and finally out of the fluid outlet 112.

Typically, as depicted in FIG. 11, the terminal end 104 is sealably affixed to the housing 102 after the inner post 140 and the filtration media 120 have been disposed within the housing 102.

FIGS. 5-10 depict various configurations of anti-drip capillary channels 130 according to the present disclosure, as viewed along the longitudinal axis 103 such that a plan view of each anti-drip capillary channel 130 may be seen. The cross-section arrows 10-10 on FIG. 2 indicate the direction of viewing for FIGS. 5-10.

Figure 5:
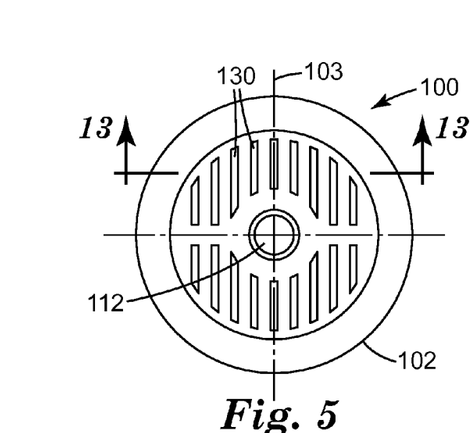
FIGS. 5-10 are top views as viewed from 10-10 of FIG. 2 of filter cartridges according to the present disclosure showing various configurations of anti-drip capillary channels.
Figure 10:
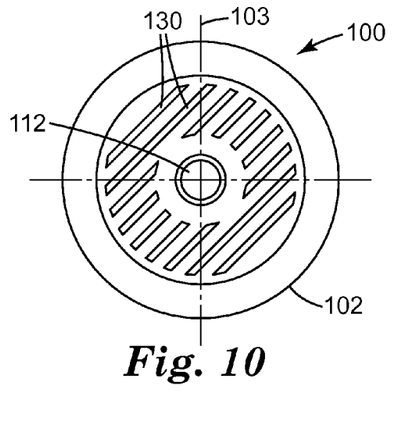

FIGS. 5 and 10 depict filter cartridges 100 wherein anti-drip capillary channels 130 are oriented parallel to one another.

Figure 9:
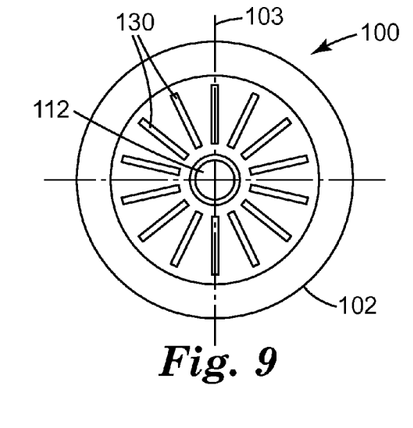

FIGS. 5, 9, and 10 depict filter cartridges 100 wherein the elongate dimension 134 of one or more of the anti-drip capillary channels comprises a substantially straight line.

Figure 6:
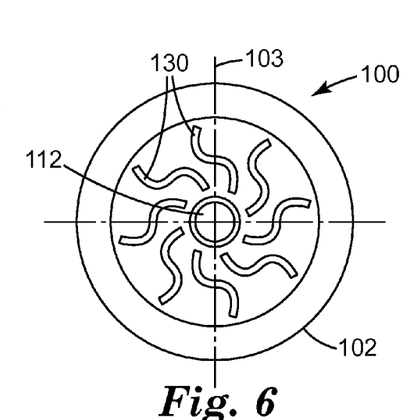
Figure 7:
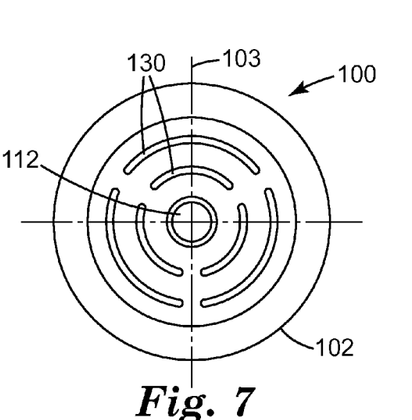

FIGS. 6 and 7 depict filter cartridges 100 wherein the elongate dimension 134 of one or more anti-drip capillary channels 130 comprises a curved portion.

FIG. 7 depicts a filter cartridge 100 wherein one or more anti-drip capillary channels 130 are oriented circumferentially about the longitudinal axis 103.

Figure 8:
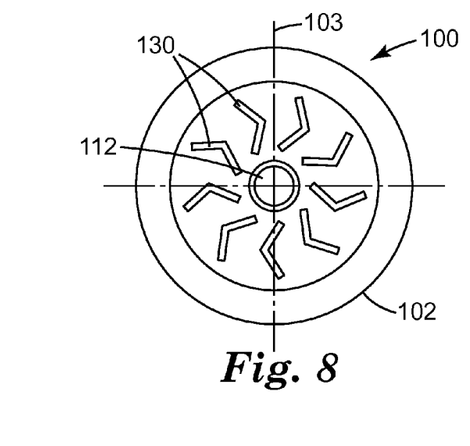

FIG. 8 depicts a filter cartridge 100 wherein the elongate dimension 134 of one or more anti-drip capillary channels 130 comprises a vertex.

FIGS. 6, 8, and 9 depict filter cartridges 100 wherein one or more anti-drip capillary channels 130 radiate outwardly from the longitudinal axis 103.

Figures 14, 15:
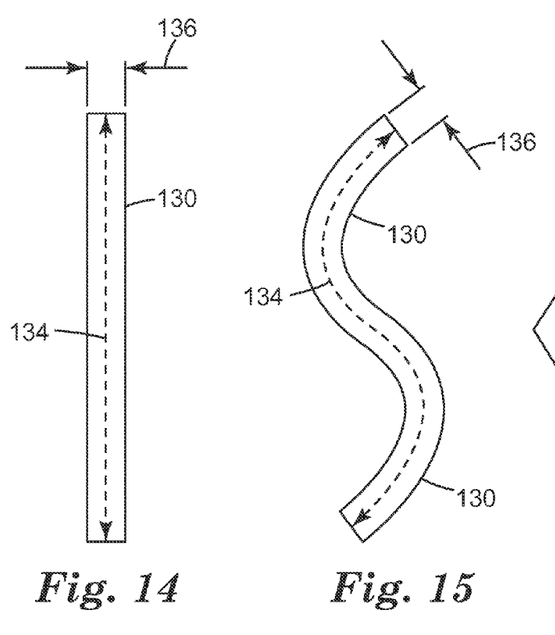
FIGS. 14-16 are plan views of transverse cross-sections of exemplary anti-drip capillary channels according to the present disclosure.
Figure 16:
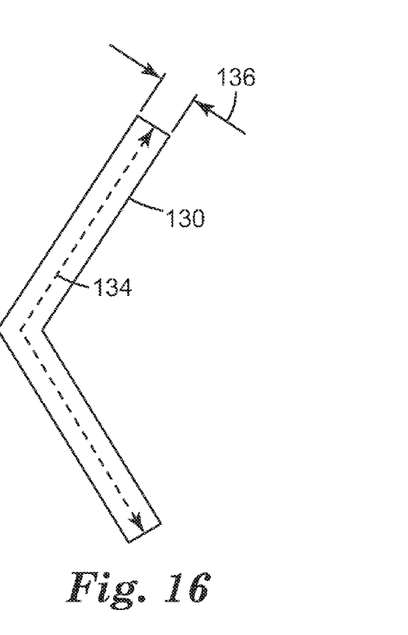

Plan views of exemplary anti-drip capillary channels 130 according to the present disclosure are shown in greater detail in FIGS. 14-16. In each of these FIGS., the minor dimension 136 and the elongate dimension 134 can be readily seen. FIG. 14 depicts an anti-drip capillary channel 130 wherein the elongate dimension 134 comprises a substantially straight line. FIG. 15 depicts an anti-drip capillary channel 130 wherein the elongate dimension 134 comprises a curved portion. FIG. 16 depicts an anti-drip capillary channel 130 wherein the elongate dimension 134 comprises a vertex. Each of FIGS. 14-16 depicts an anti-drip capillary channel 130 whose minor dimension 136 is substantially constant along the elongate dimension 134. It is also envisioned that the minor dimension 136 may increase or decrease at one or more locations along the elongate dimension 134, so long as ant-drip functionality is maintained. In some embodiments, the minor dimension 136 is in a range from about 0.010" to about 0.060", including 0.020", 0.025", 0.030", 0.035", 0.040", 0.045", 0.050", and 0.055". In one embodiment, the minor dimension 136 is in a range from about 0.025" to about 0.040". It should be understood that a relatively smaller minor dimension 136 may tend to increase flow restriction, while a too large a minor dimension 136 may result in failure of capillary action to pull fluid into the aperture, thus causing the aperture to no longer be an anti-drip capillary channel 130.

Typically, the elongate dimension 134 will be at least about two-times the magnitude of the minor dimension 136, although an anti-drip capillary channel 130 may benefit any time the elongate dimension 134 is greater than the minor dimension 136. In some embodiments, the elongate dimension 134 is greater than about 0.080". It is envisioned that, for a given minor dimension 136, the elongate dimension may be chosen to be as long as desired for a given application, so long as the aperture continues to function as an anti-drip capillary channel 130. It should be understood that the elongate dimension 134 is a dimension that is measured along an elongate path or trajectory of an anti-drip capillary channel 130, and is not necessary a straight line. For example, in FIG. 15, the elongate dimension 134 is measured along an elongate path comprising a curved portion. Similarly, in FIG. 16, the elongate dimension 134 is measured along an elongate path comprising a sharp bend. In some embodiments, such as those depicted in FIGS. 2, 3, 4, 5, 7, 10, and 12, the elongate dimension 134 may be different for one or more anti-drip capillary channels 130 on a given filter cartridge 100.

FIG. 11 depicts a cross section of an exemplary filter cartridge 100 according to the present disclosure wherein the filter cartridge 100 contains residual water and is tipped on its side. As shown, water has been pulled by capillary action into anti-drip capillary channels 130 and remains captured due to the surface tension of the water such that no air is permitted to infiltrate the anti-drip capillary channels 130. Thus, residual water is prevented from flowing through the anti-drip capillary channels 130 and dripping from the filter cartridge 100. At the same time, residual water in central conduit 144 is prevented from flowing out through fluid outlet 112 due to the vacuum seal created by the water captured in the anti-drip capillary channels 130.

FIG. 13 is a detailed cross-sectional view taken at 13-13 of FIG. 5 showing fluid pulled by capillary action into anti-drip capillary channels 130 formed in a flange 160. As depicted, each anti-drip capillary channel 130 comprises a depth dimension 138, a minor dimension 136, an elongate dimension 134 (not shown), and a channel sidewall 132. As shown, the contact angle $\phi$ of the fluid against the channel sidewall 132 is less than 90 degrees (i.e., a negative contact angle), and the fluid thus forms a concave profile in cross-section. The nature of interaction between the material of the channel sidewall 132, the fluid employed, and the atmosphere (typically air) determines the contact angle and the degree of adhesion between the fluid and the channel sidewall 132. By way of comparison, in a typical mercury-filled glass-tube thermometer, the mercury and glass interact to form a convex profile. Depending on the working fluid, the material chosen to construct the anti-drip capillary channels 130 should be chosen to facilitate proper force interactions between the working fluid, the channel sidewall 132, and the air such that anti-drip functionality is maintained. Typically, though not necessarily, the working fluid is water.

It has been observed that when the transverse cross-section of each anti-drip capillary channel 130 is elongate in at least one direction (as opposed to a circular cross-section), the depth dimension 138 must typically be greater than when a Fritze '355-type small diameter bore is employed. Because a larger depth dimension 138 provides proportionally more channel sidewall 132 surface area for interaction with a fluid, the fluid may be better retained in the anti-drip capillary channel 130 as the depth dimension 138 is increased. However, making the depth dimension 138 too large may result in restriction of fluid flow, and therefore increased pressure drop across a filter cartridge 100. In this regard, the depth dimension 138 may be advantageously chosen in a range from about 0.30 inches (about 0.762 centimeter) to about 1.0 inches (about 2.54 centimeters), including 0.35 inches (0.889 centimeter), 0.40 inches (1.016 centimeters), 0.45 inches (1.143 centimeters), 0.50 inches (1.27 centimeters), 0.55 inches (1.397 centimeters), 0.60 inches (1.524 centimeters), 0.70 inches (1.778 centimeters), 0.80 inches (2.032 centimeters), and 0.90 inches (2.286 centimeters).

It has also been observed that a relatively rougher surface of the channel sidewall 132 can provide surprisingly better retention of fluid within the anti-drip capillary channels 130. For example, prototype flanges 160 comprising anti-drip capillary channels 130 produced by stereolithography (SLA) had rougher surfaces than those produced by injection molding with typical mold surface finishes. Unexpectedly, the rough SLA prototypes retained fluid better than the more polished injection molded parts. It is believed that, because a rougher channel sidewall 132 surface finish can provide more channel sidewall 132 surface area for interaction with a fluid, the fluid may be better retained in the anti-drip capillary channel 130 as the surface roughness is increased. A typical Ra surface roughness height for an injection molded part may be in a range from about 10 microinches (about 0.254 micrometer) to about 32 microinches (about 0.8128 micrometer), as determined according to ASME B46.1. In this regard, the Ra surface roughness height of the channel sidewall 132 may be advantageously designed to be greater than about 64 microinches (about 1.626 micrometers), including 128 microinches (3.251 micrometers), 256 microinches (6.502 micrometers), 500 microinches (12.7 micrometers), 1000 microinches (25.4 micrometers), 1250 microinches (31.75 micrometers), 1500 microinches (38.1 micrometers), or even 2000 microinches (50.8 micrometers). In one embodiment, the Ra surface roughness height of the channel sidewall 132 is in a range from about 900 microinches (about 22.86 micrometers) to about 1600 microinches (about 40.64 micrometers). Different Ra surface roughness height values were obtained by specifying different surface finishes or textures on the part of the mold used to form the one or more anti-drip capillary channels 130.

Figure 12:
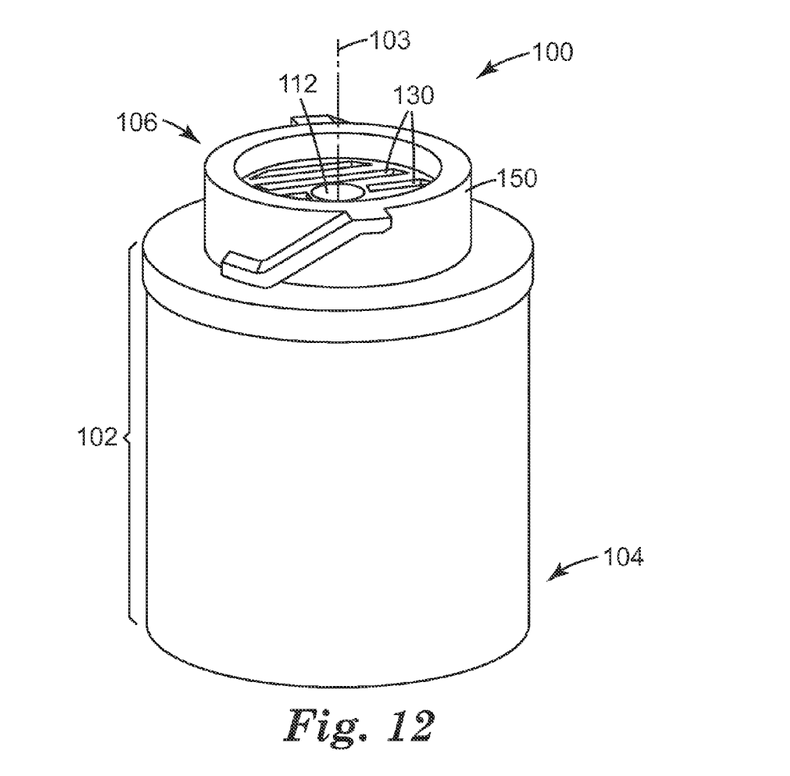
FIG. 12 is a perspective view of a filter cartridge according to the present disclosure.

As shown in FIG. 12, it is also envisioned that anti-drip capillary channels 130 may be disposed on a connective end 106 of a filter cartridge 100 constructed as shown in FIGS. 3, 9, and 10 of Fritze '355, or as shown and described in U.S. Pat. No. 7,481,928 to Fritze ("Fritze '928"), the disclosure of which is hereby incorporated by reference in its entirety. It is also envisioned that that anti-drip capillary channels 130 may be employed in filter cartridges as shown and described in U.S. Pat. Nos. 6,949,189 and 7,135,113 to Bassett et al., the disclosures of which are hereby incorporated by reference in their entirety.

Various modifications and alterations of the invention will be apparent to those skilled in the art without departing from the spirit and scope of the invention. It should be understood that the invention is not limited to illustrative embodiments set forth herein.

What is claimed is:

1. A filter cartridge comprising:
   a housing comprising a terminal end, a connective end, and a longitudinal axis, the connective end comprising a fluid inlet opening, a fluid outlet opening; and
   a filtration media disposed within the housing between the terminal end and the connective end;
   wherein at least one of the fluid inlet opening and the fluid outlet opening comprises one or more anti-drip capillary channels;
   at least one of the one or more anti-drip capillary channels comprising a depth dimension measured along the longitudinal axis, and a transverse cross-section in a plane perpendicular to the longitudinal axis, the transverse cross-section comprising an elongate dimension and a minor dimension; and
   wherein the elongate dimension is greater than the minor dimension.

2. The filter cartridge of claim 1 wherein the minor dimension is in a range from about 0.020 inches (about 0.0508 centimeter) to about 0.060 inches (about 0.1524 centimeter) and the elongate dimension is greater than about 0.080 inches (about 0.2032 centimeter).

3. The filter cartridge of claim 2 wherein the minor dimension is in a range from about 0.025 inches (about 0.0635 centimeter) to about 0.040 inches (about 0.1016centimeter).

4. The filter cartridge of claim 3 wherein the minor dimension is about 0.030inches (about 0.0762 centimeter).

5. The filter cartridge of claim 1 wherein the elongate dimension of the at least one or more of the anti-drip capillary channels comprises a curved portion.

6. The filter cartridge of claim 1 wherein the elongate dimension of the at least one or more of the anti-drip capillary channels comprises a substantially straight line.

7. The filter cartridge of claim 1 wherein the elongate dimension of the at least one or more of the anti-drip capillary channels comprises a vertex.

8. The filter cartridge of claim 1 wherein the minor dimension of the at least one or more of the anti-drip capillary channels is substantially constant along the elongate dimension.

9. The filter cartridge of claim 1 wherein the at least one or more of the anti-drip capillary channels radiates outwardly from the longitudinal axis.

10. The filter cartridge of claim 1 wherein the at least or more of the anti-drip capillary channels are oriented parallel to one another.

11. The filter cartridge of claim 1 wherein the at least one or more of the anti-drip capillary channels are oriented circumferentially about the longitudinal axis.

12. The filter cartridge of claim 1 wherein the connective end comprises:
    an inner post sealed to the filtration media and comprising a central conduit in fluid communication with an open inner core of the filtration media; and
    a sleeve formed in the connective end of the housing and radially surrounding the inner post;
    wherein the at least one or more anti-drip capillary channels are disposed on a flange spanning an annular region between the inner post and the sleeve.

13. The filter cartridge of claim 12 wherein the inner post comprises the flange.

14. The filter cartridge of claim 13 wherein the flange is not affixed to the sleeve.

15. The filter cartridge of claim 13 wherein the at least one or more of the anti-drip capillary channels interrupts a radial outer edge of the flange.

16. The filter cartridge of claim 12 wherein the sleeve comprises the flange.

17. The filter cartridge of claim 16 wherein the flange is not affixed to the inner post.

18. The filter cartridge of claim 16 wherein the at least one or more of the anti-drip capillary channels interrupts a radial inner edge of the flange.

19. The filter cartridge of claim 12 wherein the central conduit forms the fluid outlet opening and the at least one or more anti-drip capillary channels forms the fluid inlet opening.

20. The filter cartridge of claim 1 wherein the at least one or more anti-drip capillary channels comprises at least one channel sidewall, wherein the Ra surface roughness height of the at least one channel sidewall is greater than about 64 micro-inches (about 1.626 micrometers).

21. The filter cartridge of claim 1 wherein the depth dimension is in a range from about 0.30 inches (about 0.762 centimeter) to about 1.0 inches (about 2.54 centimeters).

22. The filter cartridge of claim 21 wherein the depth dimension is in a range from about 0.40 inches (about 1.016 centimeters) to about 0.70 inches (about 1.778 centimeters).

* * * * *

UNITED STATES PATENT AND TRADEMARK OFFICE
CERTIFICATE OF CORRECTION

PATENT NO.        : 9,011,686 B2
APPLICATION NO.   : 13/510170
DATED             : April 21, 2015
INVENTOR(S)       : Richard Kirchner Page 1 of 1

It is certified that error appears in the above-identified patent and that said Letters Patent is hereby corrected as shown below:

Specification

Column 1
Line 7, delete "PCT/US2010/057197filed" and insert
-- PCT/US2010/057197 filed --, therefor.

Claims

Column 9
Line 65, in Claim 1, delete "opening, a" and insert -- opening and a --, therefor.

Column 10
Line 19, in Claim 3, delete "0.1016centimeter)." and insert -- 0.1016 centimeter). --, therefor.
Line 21, in Claim 4, delete "0.030inches" and insert -- 0.030 inches --, therefor.
Line 38, in Claim 10, delete "at least or" and insert -- at least one or --, therefor.

Signed and Sealed this
Thirteenth Day of October, 2015

Michelle K. Lee
*Director of the United States Patent and Trademark Office*